Patented Feb. 4, 1930

1,745,843

UNITED STATES PATENT OFFICE

HANS T. CLARKE, OF ROCHESTER, NEW YORK, ASSIGNOR TO EASTMAN KODAK COMPANY, OF ROCHESTER, NEW YORK, A CORPORATION OF NEW YORK

METHOD OF MAKING AMINOPHENOL DERIVATIVES

No Drawing.   Application filed April 3, 1924. Serial No. 704,072.

This invention relates to an improved method for the preparation of monoalkyl derivatives of o-aminophenol. The monomethyl derivative is of particular importance, as its sulfate is a well known photographic developing agent.

The regular methods of methylation when applied to o-aminophenol yield as the principal product the dimethyl compound, unless a very large excess of the original aminophenol be present. The latter condition naturally involves disadvantageously large amounts of labor and losses of product.

I have found that the o-aminophenol may be so treated with a carboxylic acid as to yield the corresponding benzoxazole, and this compound forms with an alkyl halide or other alkyl ester of the inorganic type an addition product which on treatment with dilute acids or alkalies is practically quantitatively converted into the acyl derivative of the required monoalkyl aminophenol; this acyl compound can then be readily hydrolyzed and the required salt prepared in the usual way, the carboxylic acid being regenerated. It will be seen that in this process the acid plays a cyclic role.

The steps of the process will now be more fully described.

*Step (a)*.—A convenient method of effecting the first step is to heat to a temperature between 175° to 190° C., the o-aminophenol with a slight excess of acetic acid with the use of a fractionating column until no more water distills over, yielding the known compound 1-methyl-benzoxazole.

The reactions involved in this step are the following:

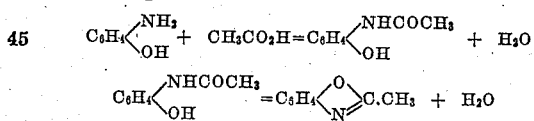

*Step (b)*.—The 1-methyl-benzoxazole is warmed to 80–100° C. with an equimolar quantity of methyl sulfate. The resulting addition compound separates in the form of colorless needles. It has been found advantageous, though not necessary, to dilute the original oxazole with an indifferent solvent of sufficiently high boiling point, such as toluene, from which the salt separates and may thus be obtained, by decantation of the solvent, free of unchanged reagents. The degree of dilution may be varied within extremely wide limits. As the salt is in a molten state at the reaction temperature, the reaction mixture must, of course, first be allowed to cool.

The reaction involved in step (b) is the following:

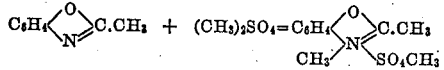

*Step (c)*.—The addition product is then dissolved in water and treated in the cold with a double molecular quantity of alkali, such as sodium hydroxide, the particular alkali being comparatively immaterial, in dilute solution, the degree of solution within wide limits being immaterial, and then acidified with hydrochloric, sulphuric or other acid, the degree of dilution of the acid within wide limits being immaterial, whereupon the acetyl-methyl-aminophenol separates in crystalline condition and is filtered off.

The reactions involved in step (c) are represented by the following equations:

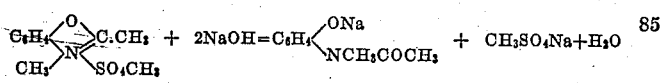

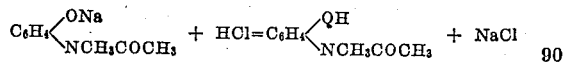

*Step (d)*.—The acetyl-methyl-aminophenol is then hydrolyzed by boiling with an excess of dilute sulfuric acid, then freed from such excess acid by means of calcium carbonate or similar material producing an insoluble sulfate and the resulting solution cooled when o-methyl aminophenol sulfate separates in crystalline form and the original carboxylic acid is regenerated.

The reaction involved in step (d) is represented by the following equations:

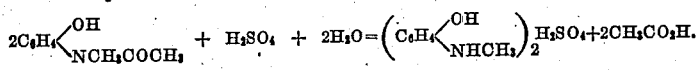

Having thus described my invention, what I claim as new and desire to secure by Letters Patent is:

The herein described process comprising the treatment of o-aminophenol with acetic acid at a temperature between 175° and 190° C. until 1-methyl-benzoxazole is produced, the treatment of the 1-methyl-benzoxazole with methyl sulfate at a temperature between 80° and 100° C., until an addition compound is produced; the treatment of the addition compound with an alkali and then with an acid until acetyl-methyl-aminophenol is produced, then boiling this last compound with sulphuric acid to form o-methyl-aminophenol sulfate and to regenerate acetic acid and utilizing the regenerated acetic acid to continue the process.

Signed at Rochester, New York, this 1st day of April, 1924.

HANS T. CLARKE.